(12) United States Patent  
Wu

(10) Patent No.: US 10,887,805 B2  
(45) Date of Patent: Jan. 5, 2021

(54) DEVICE AND METHOD OF HANDLING HANDOVER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/472,288

(22) Filed: Mar. 29, 2017

(65) Prior Publication Data  
US 2017/0289876 A1    Oct. 5, 2017

Related U.S. Application Data

(60) Provisional application No. 62/316,585, filed on Apr. 1, 2016.

(51) Int. Cl.  
*H04W 36/30* (2009.01)  
*H04W 72/00* (2009.01)  
(Continued)

(52) U.S. Cl.  
CPC ....... *H04W 36/08* (2013.01); *H04W 36/0016* (2013.01); *H04W 36/32* (2013.01);  
(Continued)

(58) Field of Classification Search  
CPC ......... H04W 36/0016; H04W 72/0426; H04W 36/00; H04W 36/08; H04W 36/32;  
(Continued)

(56) References Cited

U.S. PATENT DOCUMENTS

2014/0112180 A1* 4/2014 Axmon ................ H04W 24/08  
370/252  
2014/0226569 A1* 8/2014 Barany ............ H04W 72/0406  
370/329  
(Continued)

FOREIGN PATENT DOCUMENTS

CN    101938828 A    1/2011  
CN    102340844 A    2/2012  
(Continued)

OTHER PUBLICATIONS

Search Report dated Aug. 10, 2017 for EP application No. 17163971.9, pp. 1-5.  
(Continued)

*Primary Examiner* — Khawar Iqbal  
(74) *Attorney, Agent, or Firm* — Winston Hsu

(57) ABSTRACT

A first base station (BS) for handling a handover with a second BS comprises a storage unit for storing instructions and a processing circuit coupled to the storage unit. The processing circuit is configured to execute the instructions stored in the storage unit. The instructions comprise determining to hand over a first communication device to the second BS; generating a first handover request message, wherein the first handover request message comprises one of first system information and second system information according to whether the first communication device is in coverage enhancement (CE) or according to a type of the first communication device; transmitting the first handover request message to the second BS; receiving a first handover request acknowledgement message from the second BS; and transmitting a first handover command to the first communication device in response to the reception of the first handover request acknowledgement message.

11 Claims, 4 Drawing Sheets

(51) Int. Cl.
*H04W 36/08* (2009.01)
*H04W 36/00* (2009.01)
*H04W 36/32* (2009.01)
*H04W 72/04* (2009.01)

(52) U.S. Cl.
CPC .... *H04W 72/0426* (2013.01); *H04W 36/0033* (2013.01); *H04W 36/0072* (2013.01)

(58) Field of Classification Search
CPC ....... H04W 72/04; H04W 92/20; H04W 4/00; H04W 36/22; H04W 28/085; H04W 88/02; H04W 88/16
See application file for complete search history.

(56) References Cited

U.S. PATENT DOCUMENTS

| | | | |
|---|---|---|---|
| 2015/0045038 A1* | 2/2015 | Gao | H04W 36/22 455/438 |
| 2015/0327155 A1* | 11/2015 | Lee | H04W 48/12 370/329 |
| 2015/0365869 A1 | 12/2015 | Gao | |
| 2016/0095034 A1* | 3/2016 | Hampel | H04W 36/14 370/331 |
| 2016/0338137 A1* | 11/2016 | Mishra | H04W 36/08 |
| 2017/0135012 A1* | 5/2017 | Zhang | H04W 48/16 |
| 2017/0180952 A1* | 6/2017 | Kim | H04W 72/121 |
| 2018/0007597 A1* | 1/2018 | Futaki | H04W 36/04 |
| 2018/0014237 A1* | 1/2018 | Xu | H04W 36/0055 |
| 2018/0227815 A1* | 8/2018 | Sharma | H04W 88/06 |
| 2018/0317148 A1* | 11/2018 | Jin | H04W 36/08 |
| 2019/0357058 A1* | 11/2019 | Futaki | H04W 68/005 |
| 2019/0373590 A1* | 12/2019 | Tabet | H04W 48/12 |
| 2019/0387497 A1* | 12/2019 | Xu | H04W 92/20 |
| 2019/0394677 A1* | 12/2019 | Fischer | H04W 28/0278 |
| 2020/0022047 A1* | 1/2020 | Kim | H04W 36/08 |
| 2020/0077318 A1* | 3/2020 | Basu Mallick | H04W 74/0833 |
| 2020/0154436 A1* | 5/2020 | Marinier | H04W 88/06 |
| 2020/0178313 A1* | 6/2020 | Su | H04J 11/00 |
| 2020/0329413 A1* | 10/2020 | Xu | H04W 76/27 |

FOREIGN PATENT DOCUMENTS

| | | |
|---|---|---|
| CN | 104936164 A | 9/2015 |
| CN | 105338519 A | 2/2016 |
| EP | 3101941 A1 | 12/2016 |
| WO | 2015114695 A1 | 8/2015 |
| WO | 2015116870 A1 | 8/2015 |
| WO | 2016021870 A1 | 2/2016 |

OTHER PUBLICATIONS

ZTE, "Further considerations on SIB and Paging for MTC enhancement", 3GPP TSG RAN WG1 Meeting #80, R1-150145, Feb. 9-13, 2015, Athens, Greece, XP050948864, pp. 1-4.

3GPP TS 36.300 V13.2.0 (Dec. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

ZTE, Further considerations on SIB and Paging for MTC enhancement, 3GPP TSG RAN WG1 Meeting #80 R1-150145, Athens, Greece, Feb. 9-13, 2015, p. 1-7.

Office action dated Apr. 30, 2019 for the China application No. 201710214328.7, filed Apr. 1, 2017, p. 1-10.

* cited by examiner

DEVICE AND METHOD OF HANDLING HANDOVER

CROSS REFERENCE TO RELATED APPLICATIONS

This application claims the benefit of U.S. Provisional Application No. 62/316,585 filed on Apr. 1, 2016, which is incorporated herein by reference.

BACKGROUND OF THE INVENTION

1. Field of the Invention

The present invention relates to a device and a method used in a wireless communication system, and more particularly, to a device and a method of handling a handover.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

A UE is connected to a first eNB in coverage enhancement (CE) via a cell of the first eNB. It is not clear how the first eNB can initiate a handover to hand over the UE in from the first eNB to a second eNB.

SUMMARY OF THE INVENTION

The present invention therefore provides a communication device and method for handling a handover to solve the abovementioned problem.

A first base station (BS) for handling a handover with a second BS comprises a storage unit for storing instructions and a processing circuit coupled to the storage unit. The processing circuit is configured to execute the instructions stored in the storage unit. The instructions comprise connecting to a first communication device; determining to hand over the first communication device to the second BS; generating a first handover request message in response to the determination, wherein the first handover request message comprises one of first system information and second system information according to whether the first communication device is in coverage enhancement (CE) or according to a type of the first communication device; transmitting the first handover request message to the second BS; receiving a first handover request acknowledgement message in response to the first handover request message from the second BS; and transmitting a first handover command to the first communication device in response to the reception of the first handover request acknowledgement message.

A second base station (BS) for handling a handover with a first BS comprises a storage unit for storing instructions and a processing circuit coupled to the storage unit. The processing circuit is configured to execute the instructions stored in the storage unit. The instructions comprise connecting to the first BS; receiving a handover request message for a first communication device from the first BS; generating a handover request acknowledgement message in response to the handover request message; generating a first configuration according to first system information and transmitting the handover request acknowledgement message comprising the first configuration to the first BS, if the handover request message comprises the first system information and the first communication device is in coverage enhancement (CE) or a type of the first communication device is a first type; and generating a second configuration according to second system information and transmitting the handover request acknowledgement message comprising the second configuration to the first BS, if the handover request message comprises the second system information and the first communication device is in not CE or the type of the first communication device is a second type.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
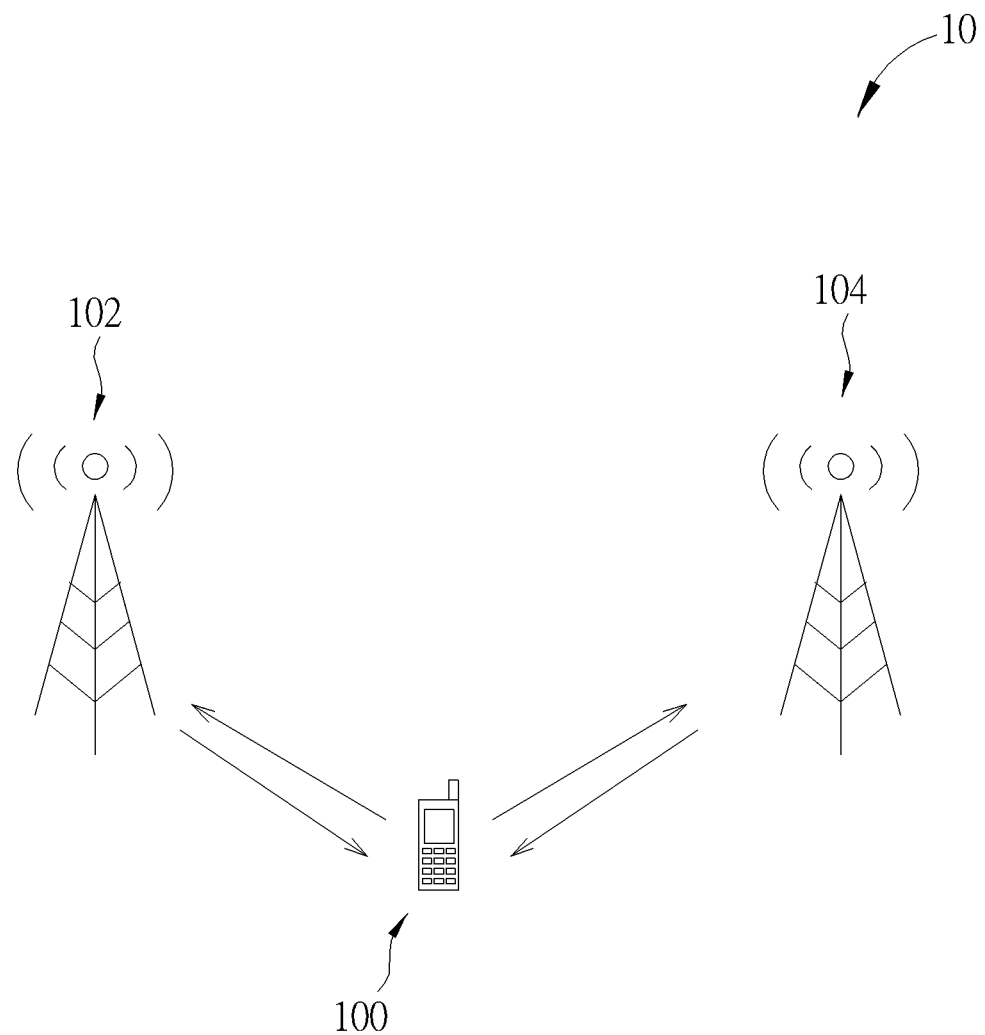
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, base stations (BSs) 102 and 104. In FIG. 1, the communication device 100, the BS 102 and the BS 104 and are simply utilized for illustrating the structure of the wireless communication system 10. Practically, the BS 102 and/or the BS 104 may be BSs in a narrowband (NB) internet of things (IoT) network or in an evolved Universal Terrestrial Radio Access Network (E-UTRAN). The BS 102 and/or the BS 104 may be fifth generation (5G) BSs (e.g., gNBs) in a 5G network. In FIG. 1, coverage areas of the BS 102 and the BS 104 may be overlapped or non-overlapped. In general, a BS may also be used to refer any of the eNB and the 5G BS.

The communication device 100 may be a user equipment (UE), a mobile phone, a laptop, a tablet computer, an electronic book, a portable computer system, a vehicle, or an airplane. For uplink (UL), the communication device 100 is the transmitter and the BS 102 and/or the BS 104 is the receiver, and for downlink (DL), the BS 102 and/or the BS 104 is the transmitter and the communication device 100 is the receiver.

The communication device 100 may be a bandwidth reduced low complexity (BL) communication device by which the maximum bandwidth for transmission and reception is operated is lower than a system bandwidth operated by the BS. For example, the BL communication device operates in any LTE system bandwidth (e.g., 3, 5, 10, 15 or 20 MHz) but with a limited channel bandwidth of 6 physical resource blocks (PRBs) (corresponding to the maximum channel bandwidth available in a 1.4 MHz LTE system) in DL and UL. The BL communication device may access a cell of the BS 102 or the BS 104, if system information (e.g., a Master Information Block (MIB)) of the cell indicates that the access of the BL communication device is supported. Otherwise, the BL communication device considers the cell as barred.

The communication device 100 in coverage enhancement (CE) uses enhanced coverage functionality (e.g., transmit multiple repetitions of data and/or signal, and/or receive multiple repetitions of data and/or signal) to access a cell of the BS 102 or the BS 104. The communication device 100 may access a cell using enhanced coverage techniques only if system information (e.g., MIB) of the cell indicates that access of UEs in CE is supported.

Figure 2:
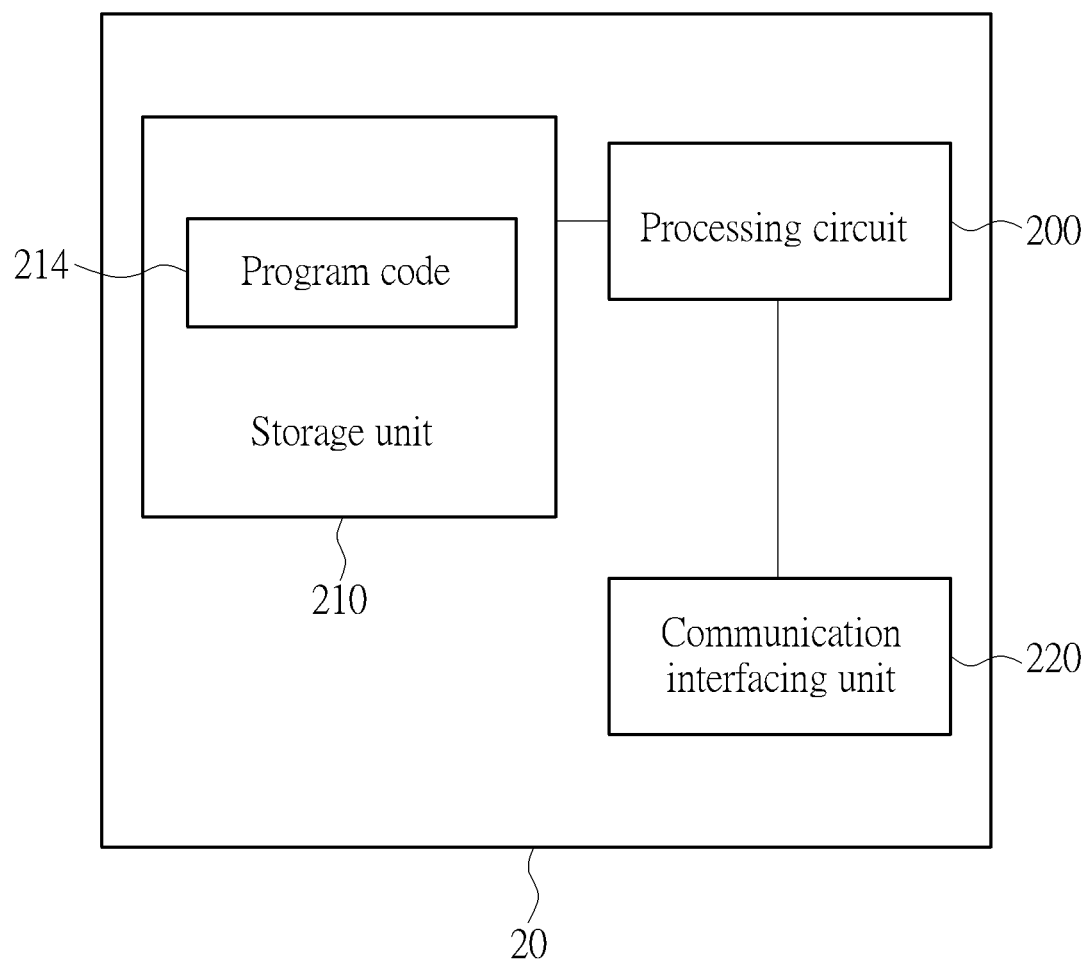
FIG. 2 is a schematic diagram of a communication device according to an example of the present invention.

FIG. 2 is a schematic diagram of a communication device 20 according to an example of the present invention. The communication device 20 may be the communication device 100, the BS 102 and/or the BS 104 shown in FIG. 1, but is not limited herein. The communication device 20 includes a processing circuit 200 such as a microprocessor or Application Specific Integrated Circuit, a storage unit 210 and a communication interfacing unit 220. The storage unit 210 may be any data storage device that stores a program code 214, accessed and executed by the processing circuit 200. Examples of the storage unit 210 include but are not limited to read-only memory, flash memory, random-access memory, hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

In the following embodiments, a UE is used to represent the communication device 100 in FIG. 1, to simplify the illustration of the embodiments.

Figure 3:
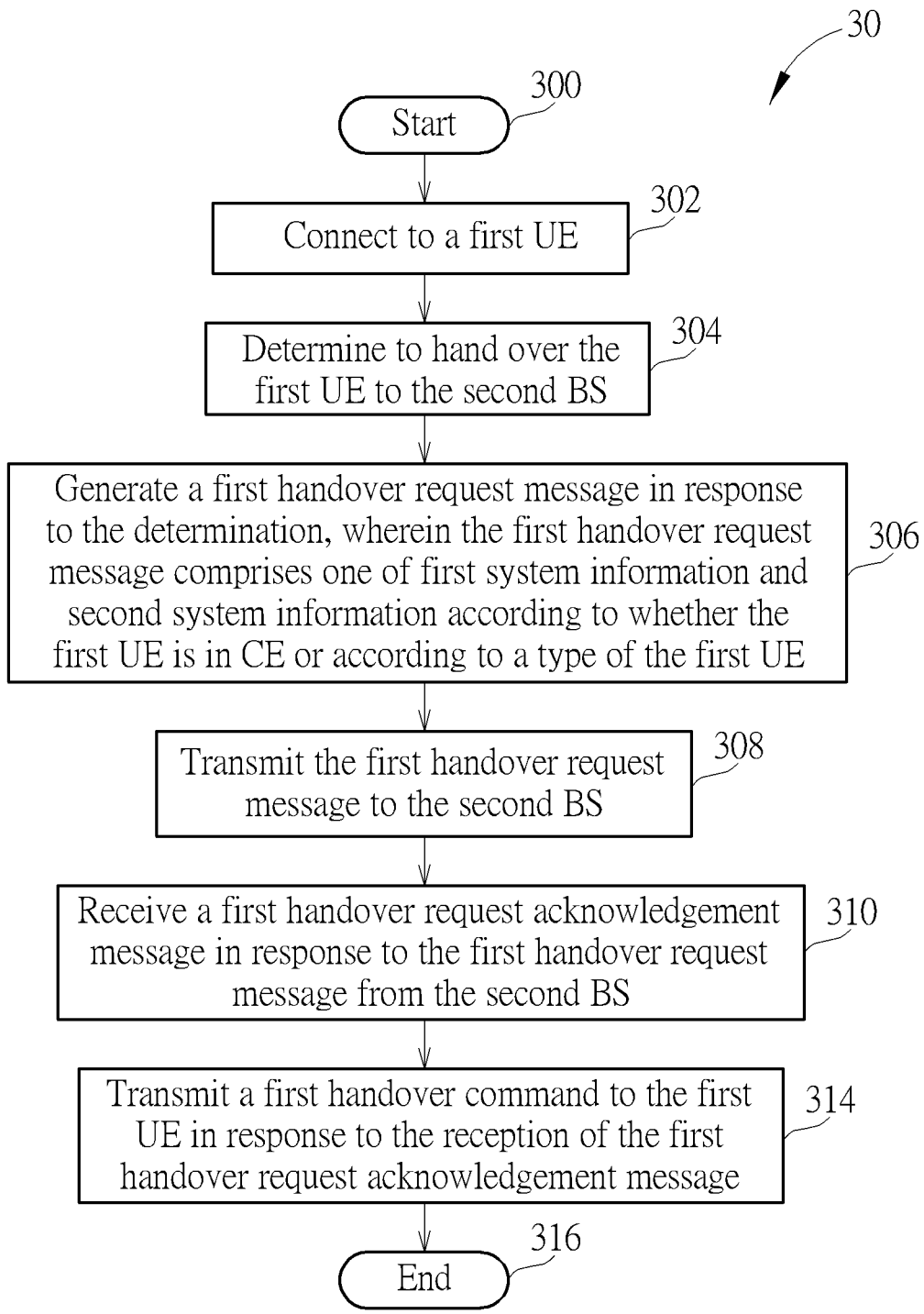
FIG. 3 is a flowchart of a process according to an example of the present invention.

FIG. 3 is a flowchart of a process 30 according to an example of the present invention. The process 30 may be utilized in a first BS (e.g., the BS 102), to handle a handover with a second BS (e.g., the BS 104). The process 30 includes the following steps:

Step 300: Start.

Step 302: Connect to a first UE.

Step 304: Determine to hand over the first UE to the second BS.

Step 306: Generate a first handover request message in response to the determination, wherein the first handover request message comprises one of first system information and second system information according to whether the first UE is in CE or according to a type of the first UE.

Step 308: Transmit the first handover request message to the second BS.

Step 310: Receive a first handover request acknowledgement message in response to the first handover request message from the second BS.

Step 312: Transmit a first handover command to the first UE in response to the reception of the first handover request acknowledgement message.

Step 314: End.

According to the process 30, the first BS connects to a first UE (e.g., the communication device 100), and determines to hand over the first UE to the second BS. The first BS generates a first handover request message in response to the determination, wherein the first handover request message comprises one of first system information and second system information according to whether the first UE is in CE or according to a type of the first UE. Then, the first BS transmits the first handover request message to the second BS. The first BS receives a first handover request acknowledgement message in response to the first handover request message from the second BS. Accordingly, the first BS transmits a first handover command to the first UE in response to the reception of the first handover request acknowledgement message. That is, whether a UE is in CE or a type of the UE is used for determining content of a handover request message for handing over the UE. Thus, the handover can be performed adaptively according to a state or mode of the UE or a type of the UE. Performance of the UE can be improved correspondingly.

Realization of the process 30 is not limited to the above description. The following examples may be applied to the process 30.

In one example, the first handover request message includes the first system information when the first UE is in CE, and the first handover request message includes the second system information when the first UE is not in CE.

In one example, the first handover request message includes the first system information if the type of the first UE is a first type (i.e., a UE with the first type or a first-type UE), and the first handover request message includes the second system information if the type of the first UE is a second type (i.e., a UE with the second type or a second-type UE). In one example, the first type is a first category (e.g., category M1), and the second type is a second category (e.g. non-category M1 category, such as category x, wherein x is a number which may be 1, 2, . . . , 20). In one example, the first type is a (massive) machine type communication ((m)MTC), and the second type is an (evolved) mobile broad band ((e)MBB). In one example, the first type is an Ultra-Reliable and Low Latency Communications (uRLLC), and the second type is an (e)MBB. In one example, a first radio frequency (RF) capability of the first type and a second RF capability of the second type may have different maximum transmitting and/or receiving bandwidths. For example, a UE with the first type is capable of receiving maximum 1.4 MHz (e.g., BL UE), and a UE with the second type is capable of receiving maximum 20 MHz (e.g., not a BL UE). For example, the UE with the first type is capable of receiving maximum 20 MHz (e.g., supports bandwidth class 3), and the UE with the second type is capable of receiving maximum 100 MHz (e.g., supports bandwidth class 5).

In one example, the first handover request message comprises the first system information when the first UE is in CE or a type of the first UE is the first type. The first BS further connects to a second UE, and determines to hand over the second UE to the second BS. The first BS generates a second handover request message in response to the determination, wherein the second handover request message comprises the second system information when the second UE is not in CE or a type of the second UE is the second type. Then, the first BS transmits the second handover request message to the second BS. The first BS receives a second handover request acknowledgement message in response to the second handover request message from the second BS. Accordingly, the first BS transmits a second handover command to the second UE in response to the reception of the second handover request acknowledgement message. In other words, the process 30 can be applied to the handovers of multiple UEs.

In one example, the first handover request message includes a UE configuration of the first UE. The UE configuration includes at least one of a security configuration (e.g., security algorithm), a measurement configuration and a data radio bearer (DRB) configuration. In one example, the first handover request acknowledgement message includes the first handover command. Similarly, the second handover request message includes a UE configuration of the second UE. Further, the UE configuration includes at least one of a security configuration (e.g., security algorithm), a measurement configuration and a DRB configuration. In one example, the second handover request acknowledgement message includes the second handover command.

In one example, the first system information includes at least one first system information block (SIB) for the UE in CE or the first type UE, and the second system information may include at least one second SIB for the UE not in CE or the second type UE. In one example, the at least one first SIB includes a SystemInformationBlockType1-BR, and the at least one second SIB includes a SystemInformationBlockType1. In one example, the at least one first SIB includes a first SystemInformationBlockType2, and the at least one second SIB includes a second SystemInformationBlockType2. For example, the first SystemInformationBlockType2 may be included in SystemInformation-BR in a BCCH-DL-SCH-Message-BR transmitted by the first BS, and the second SystemInformationBlockType2 may be included in SystemInformation in BCCH-DL-SCH-Message transmitted by the first BS.

In one example, the first system information includes at least one IE which is not comprised in the second system information. In one example, the first and second system information includes an IE. The IE in the first system information and the IE in the second system information may have the same value or different values.

In one example, the first system information may be broadcasted by the first BS for the first UE with the first type and/or for the first UE in CE. The second system information may be broadcasted by the first BS for the first UE with the second type and/or for the first UE not in CE. In one example, the first system information and the second system information may be broadcasted by the first BS in different frequency resources and/or different time in a same carrier. For example, the first system information may be transmitted within 1.4 MHz bandwidth in the same carrier (e.g., 20 MHz) for a UE with the first type UE, and the second system information may be transmitted within more than 1.4 MHz bandwidth in the same carrier. For example, the first system information may be transmitted in more repetitions in the same carrier than the second system information in the same carrier.

Figure 4:
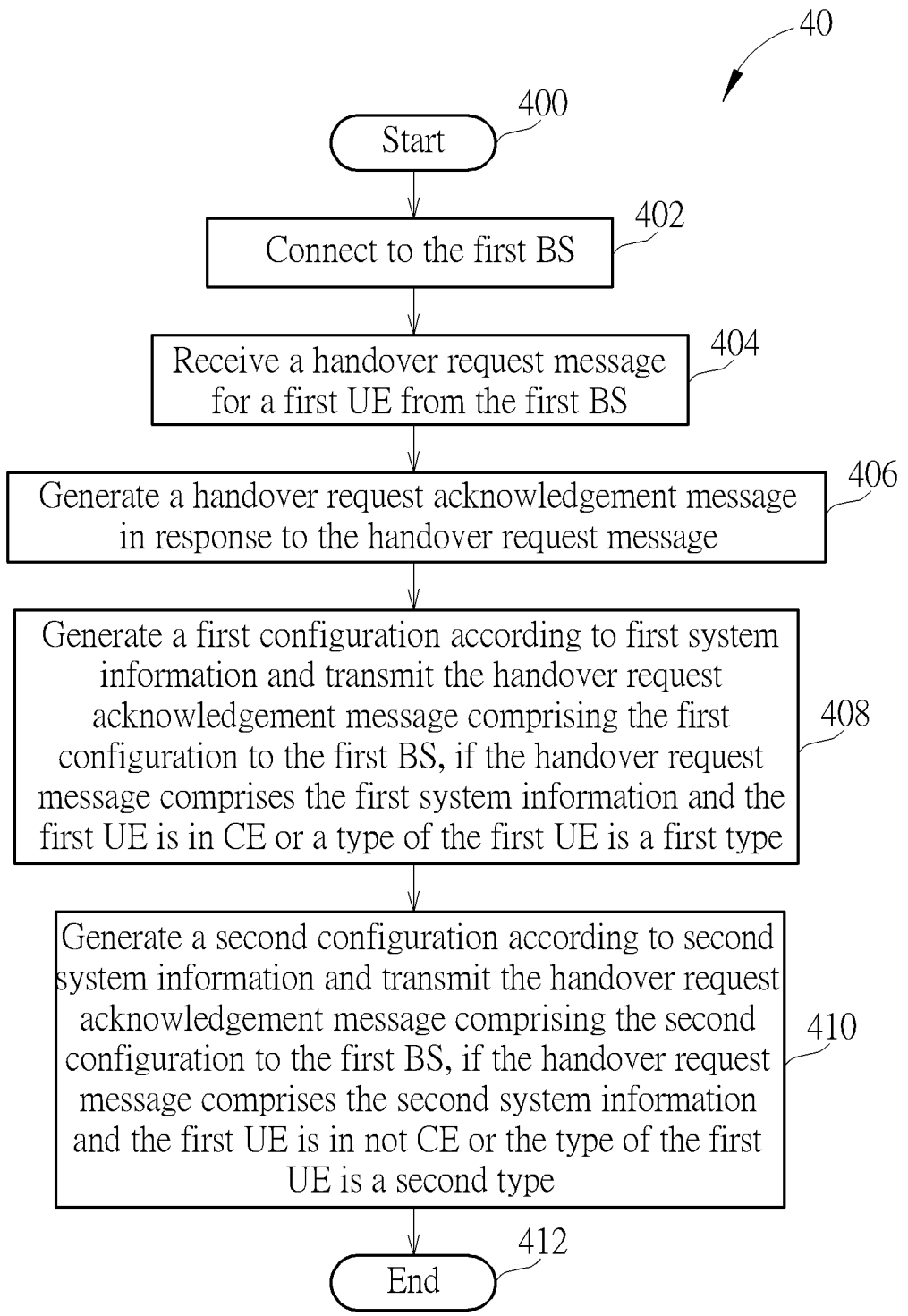
FIG. 4 is a flowchart of a process according to an example of the present invention.

FIG. 4 is a flowchart of a process 40 according to an example of the present invention. The process 40 may be utilized in a second BS (e.g., the BS 104), to handle a handover with a first BS (e.g., the BS 102). The process 40 includes the following steps:

Step 400: Start.

Step 402: Connect to the first BS.

Step 404: Receive a handover request message for a first UE from the first BS.

Step 406: Generate a handover request acknowledgement message in response to the handover request message.

Step 408: Generate a first configuration according to first system information and transmit the handover request acknowledgement message comprising the first configuration to the first BS, if the handover request message comprises the first system information and the first UE is in CE or a type of the first UE is a first type.

Step 410: Generate a second configuration according to second system information and transmit the handover request acknowledgement message comprising the second configuration to the first BS, if the handover request message comprises the second system information and the first UE is in not CE or the type of the first UE is a second type.

Step 412: End.

According to the process 40, the second BS connects to the first BS, and receives a handover request message for a first UE from the first BS. The second BS generates a handover request acknowledgement message in response to the handover request message. Accordingly, the second BS generates a first configuration according to first system information and transmits the handover request acknowledgement message comprising the first configuration to the first BS, if the handover request message comprises the first system information and the first UE is in CE or a type of the first UE is a first type. The second BS generates a second configuration according to second system information and transmits the handover request acknowledgement message comprising the second configuration to the first BS, if the handover request message comprises the second system information and the first UE is in not CE or the type of the first UE is a second type. The first configuration and the second configuration may be different. That is, whether a UE is in CE or a type of the UE is taken into consideration, when a configuration is generated according to system information in a handover request message for handing over the UE. Thus, the handover can be performed adaptively according to a state of the UE or a type of the UE. Performance of the UE can be improved correspondingly.

Realization of the process 40 is not limited to the above description. Examples described regarding the process 30 for the first system information and the second system information may be applied herein and not repeated. The following examples may be applied to the process 40.

In one example, the first configuration may be for updating a first value comprised in the first system information, and the second configuration may be for updating a second value comprised in the second system information. In one example, the first configuration may be for configuring a third configuration which is not comprised in the first system information, and the second configuration may be for configuring a fourth configuration which is not comprised in the second system information.

In one example, the first configuration includes a first RadioResourceConfigCommon, and the second configuration includes a second RadioResourceConfigCommon. In one example, the first RadioResourceConfigCommon includes a first IE which is not comprised in the second RadioResourceConfigCommon. In one example, the first RadioResourceConfigCommon and the second RadioResourceConfigCommon have at least one of a second IE and a third IE. A first value of the second IE of the first RadioResourceConfigCommon and a second value of the second IE of the second RadioResourceConfigCommon may be different. In one example, a first value of the third IE of the first RadioResourceConfigCommon and a second value of the third IE of the second RadioResourceConfigCommon may be the same.

In one example, the first configuration includes a first RLF-TimersAndConstants, and the second configuration includes a second RLF-TimersAndConstants. In one example, the first RLF-TimersAndConstants includes a first IE which is not comprised in the second RLF-TimersAndConstants. In one example, the first RLF-TimersAndConstants and the second RLF-TimersAndConstants have at least one of a second IE and a third IE. A first value of the second IE of the first RLF-TimersAndConstants and a second value of the second IE of the second RLF-TimersAndConstants may be different. In one example, a first value of the third IE of the first RLF-TimersAndConstants and a second value of the third IE of the second RLF-TimersAndConstants may be the same.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a device and a method for handling a handover. Whether a UE is in CE or a type of the UE is used for determining content of a handover request message for handing over the UE. Thus, the handover can be performed adaptively according to a state of the UE or a type of the UE. Performance of the UE can be improved correspondingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling a handover with a second BS, comprising:
   a storage unit, for storing instructions of:
   broadcasting first system information over a first bandwidth;
   broadcasting second system information over a second bandwidth larger than the first bandwidth;
   connecting to a communication device;
   determining to hand over the communication device to the second BS;
   generating a handover request message in response to the determination, wherein the handover request message comprises one of first system information and second system information according to whether the communication device is in coverage enhancement (CE) or according to a type of the communication device, wherein the handover request message includes the first system information when the communication device is in CE or the type of the communication device is a first type, and the handover request message includes the second system information when the communication device is not in CE or the type of the communication device is a second type;
   transmitting the handover request message to the second BS;
   receiving a handover request acknowledgement message in response to the handover request message from the second BS; and
   transmitting a handover command to the communication device in response to the reception of the handover request acknowledgement message;
   wherein the first system information comprises at least one first system information block (SIB) for the first communication device in CE or the first communication device with a first type, and the second system information comprises at least one second SIB for the first communication device not in CE or the first communication device with a second type; and
   a processing circuit, coupled to the storage unit, configured to execute the instructions stored in the storage unit.

2. The first BS of claim 1, wherein a first radio frequency (RF) capability of the first type and a second RF capability of the second type are different.

3. The first BS of claim 1, wherein one of the at least one first SIB is a SystemInformationBlockType1-BR, and one of the at least one second SIB is a SystemInformationBlockType1.

4. The first BS of claim 1, wherein one of the at least one first SIB is a first SystemInformationBlockType2, and one of the at least one second SIB is a second SystemInformationBlockType2.

5. The first BS of claim 1, wherein the first system information comprises at least one information element (IE) which is not comprised in the second system information.

6. The first BS of claim 1, wherein an information element (IE) in the first system information and the IE in the second system information have a same value or different values.

7. A second base station (BS) for handling a handover with a first BS, comprising:
   a storage unit, for storing instructions of:
   connecting to the first BS;
   receiving a handover request message for a first communication device from the first BS;
   generating a handover request acknowledgement message in response to the handover request message;
   generating a first configuration according to first system information and transmitting the handover request acknowledgement message comprising the first configuration to the first BS, if the handover request message includes the first system information and the communication device is in coverage enhancement (CE) or a type of the communication device is a first type; and
   generating a second configuration according to second system information and transmitting the handover request acknowledgement message comprising the second configuration to the first BS, if the handover request message includes the second system information and the communication device is not in CE or the type of the communication device is a second type
   wherein the first system information and the second system information are broadcast by the first BS (102), and the first system information is broadcast over a first bandwidth and the second system information is broadcast over a second bandwidth larger than the first bandwidth;
   wherein the first configuration configures a third configuration which is not comprised in the first system information, and the second configuration configures a fourth configuration which is not comprised in the second system information; and
   a processing circuit, coupled to the storage unit, configured to execute the instructions stored in the storage unit.

8. The second BS of claim 7, wherein the first configuration is for updating a first value comprised in the first system information, and the second configuration is for updating a second value comprised in the second system information.

9. The second BS of claim 7, wherein the first configuration comprises a first RadioResourceConfigCommon, and the second configuration comprises a second RadioResourceConfigCommon; and the first RadioResourceConfig- Common comprises a first information element (IE) which is not comprised in the second RadioResourceConfigCommon.

10. The second BS of claim 7, wherein the first configuration comprises a first RadioResourceConfigCommon, and the second configuration comprises a second RadioResourceConfigCommon; and a first value of a second information element (IE) of the first RadioResourceConfigCommon and a second value of the second IE of the second RadioResourceConfigCommon are different.

11. The second BS of claim 7, wherein the first configuration comprises a first RLF-TimersAndConstants, and the second configuration comprises a second RLF-TimersAndConstants; and the first RLF-TimersAndConstants comprises a first IE which is not comprised in the second RLF-TimersAndConstants, or a first value of a second information element (IE) of the first RLF-TimersAndConstants and a second value of the second IE of the second RLF-TimersAndConstants are different.

* * * * *